Jan. 31, 1967    K. W. GREEN ETAL    3,302,194
TRACE READING DEVICES
Filed March 6, 1964    3 Sheets-Sheet 1

United States Patent Office 3,302,194
Patented Jan. 31, 1967

3,302,194
TRACE READING DEVICES
Kenneth W. Green and Herbert Raby, Yeovil, Somerset, England, assignors to Westland Aircraft Limited, Yeovil, Somerset, England
Filed Mar. 6, 1964, Ser. No. 349,899
13 Claims. (Cl. 340—347)

This invention relates to apparatus for determining the position of points on charts, and more particularly to trace reading devices of the type used to convert information carried in analogue form into digital form.

Known types of trace reading devices require that paper, usually of the photographic type, carrying information in displacement form may be related to a convenient datum by moving the paper in relation to a final datum point; or, alternatively means, such as a cursor having provided the required datum point, are moved bodily over the paper. In order that an operator may satisfactorily carry out the aforementioned methods to attain a degree of accuracy necessary, a certain amount of training is desirable as the apparatus embodied is of a highly complicated nature. Further, each of the methods has the added disadvantage that a permanent record is not obtained at the point at which the measurement was effected.

It is with the foregoing problems in mind that the following invention has been evolved which sets out to provide an improved trace reading device, the operation of which does not require unnecessary skill or training and at the same time the method involved provides a permanent record on the trace of the point at which measurement was carried out.

According to the invention, apparatus for determining the position of a point on a chart includes electrical conductors spaced by an amount determined by the range of positions at which the point may be located, an impedance connecting the electrical conductors, means for dividing the impedance by establishing an electrical connection through the chart at a selected point thereon, and a variable impedance device for striking a balance between the means for dividing the impedance and the two conductors, the balance determining the position of the selected point. The means for dividing the impedance connecting the conductors may comprise a stylus device. Such a device may be held in the hand of the operator in the manner of a pen or pencil and is thus comfortable to hold, and the action of selecting the point of measurement is a natural movement and clearly does not require unnecessary skill or training. After a point of measurement of a trace or other point on a chart has been effected by the stylus, a permanent record of the point of measurement is present on the trace in the form of a hole, such as a pin prick, produced by the piercing action of the stylus.

Advantageously a framework may be adapted to hold large reels of paper constituting the charts and embodying means for spooling the paper from one end of the framework to the other. A transparent backing is preferably inserted beneath the paper which allows illumination through opaque records. A metal strip providing the aforesaid impedance between the conductors may conveniently be placed between the paper and the transparent backing and guides may be provided to maintain a desired relationship between the paper and the metal strip. The boundaries of the metal strip are defined by the illumination hereinbefore referred to. The records or other charts may be held flat on the glass backing by pressure pads disposed on either side of the metal strip which may conveniently comprise weights. Alternatively, the framework may be provided with two transverse metal plates disposed one either side of the metal strip over which the paper is spooled, and in this event, magnets are provided for holding the records flat on the glass or other transparent material.

An energising voltage, which may be produced by either A.C. or D.C., is applied between the ends of the metal strip and there, therefore, exists between the ends thereof a uniform slope in potential difference. The measurement of potential difference at any point can, therefore, be related to the displacement of that point from the side of the strip at zero potential which conveniently forms a datum line for all measurements effected. Thus by placing the record over such a metal strip and piercing the record, a point of potential difference is obtained which is proportional to the displacement of the point and this potential difference is then related to a digital number. For this purpose the aforesaid variable impedance device includes a series of switches, each interposed between the two said conductors, and impedances associated respectively with the switches and arranged so that the operation of the switches can strike a balance between the means for dividing the impedance and the two conductors, the arrangement being such that the state of each switch represents either state 1 or state 0 in the radix 2 digital notation. These impedances, which conveniently may be resistors, may be connected in parallel through a null detector to the stylus, each switch being arranged to connect the associated resistor to either one of the two conductors which, therefore represent state 0 and state 1 in the notation.

In order to pierce the record a rotary stylus, conveniently light in weight and comfortable to hold, may be provided thus reducing the effort required by the operator. When the stylus is used to pierce the record, the downward thrust thereof is converted into rotary motion by the action of a slow thread therein (i.e. a nut and bolt motion). When released, the stylus is returned to its normal position by a spring. In the depressed condition, after a fixed travel of the stylus has been attained, the retracting point thereof operates electrical contacts which initiates the measuring circuitry and mechanism.

In order that the invention may be clearly understood and readily carried into effect, apparatus in accordance therewith will now be described, by way of example, with reference to the accompanying drawings, in which.

Figure 4:
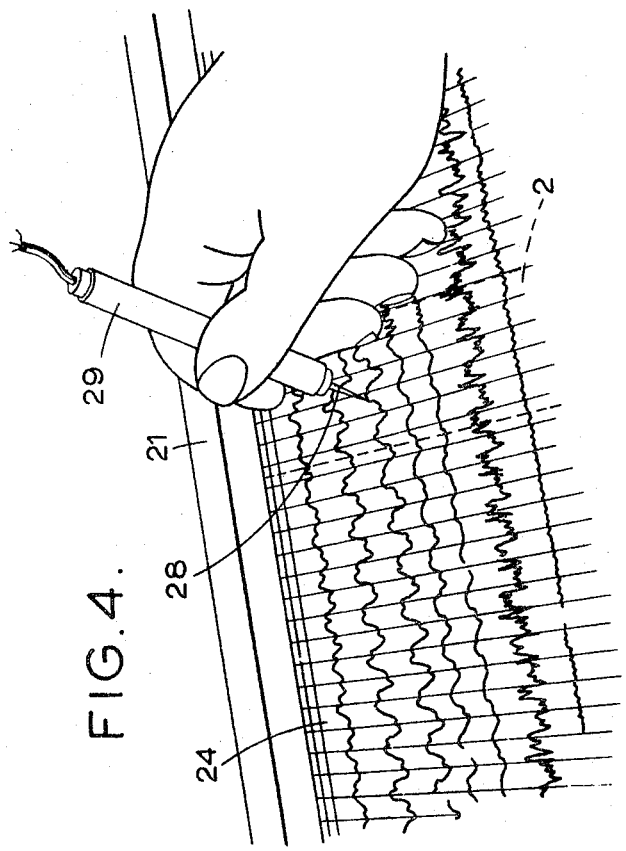
FIGURE 4 is a perspective view showing a portion of the apparatus and indicating the way in which the apparatus is used.
Figure 5:
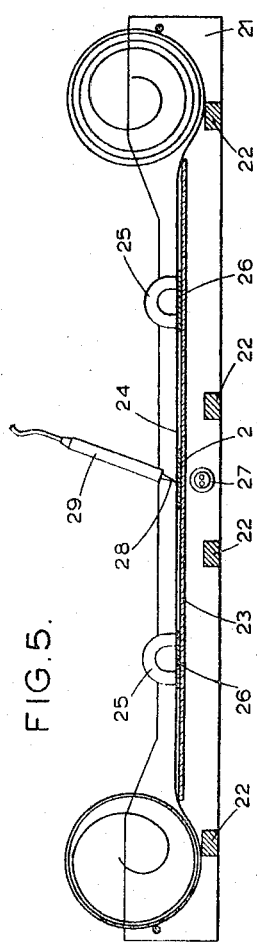
FIGURE 5 is a vertical section showing certain of the mechanical portions of the apparatus.

The apparatus shown in the drawings (FIG. 5) includes a framework having side members 21 joined by transverse members 22 and by a glass sheet 23. A record sheet or web 24, having recorded thereon traces as shown in FIGURE 4, is spooled from one end of the framework to the other so as to bring those portions of the traces that are to be investigated over a metal strip 2 that extends transversely between the side members 21, above the glass 23. When a particular portion of a trace to be investigated lies above the strip 2, the sheet 24 is held stationary and flat by magnets 25 which are attracted, with the sheet 24 intervening, by ferromagnetic strips 26 extending between the side members 21. A lamp 27 makes clear the width of the strip 2 and shines through the sheet 24 on each side of the strip 2.

Figure 6:
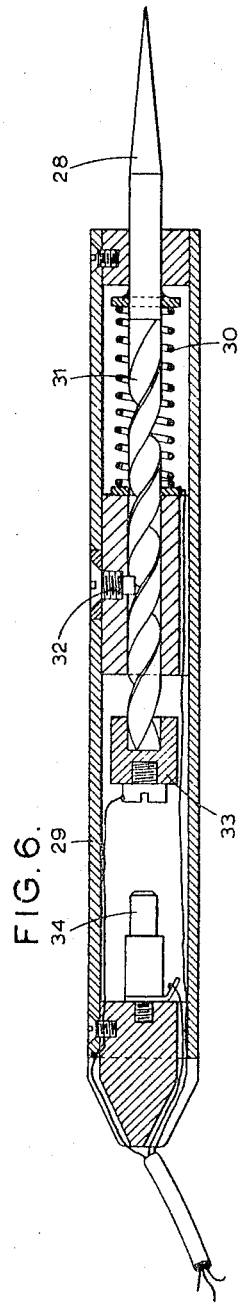
FIGURE 6 is a sectional elevation of an assembly appearing in FIGURES 4 and 5.

When it is desired to determine the ordinate of a particular point on one of the traces, a point of a stylus 28 is pressed against the point on the trace by means of a holder 29 into which the stylus 28 can yield axially against the action of a compression spring 30 (FIG. 6). The stylus is formed with a helical groove 31 which is engaged by a projection 32 fixed in the holder 29, so that the stylus 28 rotates about its axis as it yields, boring a tiny hole in the sheet 24 to make electrical contact with the strip 2 and to leave a record of the point at which the measurement has been made. The opposite end of the stylus carries a contact 33 which engages a spring loaded contact 34 at the end of the stroke of the stylus, so as to initiate the translation of the analogue value represented by the ordinate of the trace into a digital value.

A uniform slope in potential difference is produced across the metal strip 2 by applying A.C. or D.C. voltage across the ends thereof. One method of relating the potential difference obtained at a particular point on the record, i.e. at a particular point between the ends of the strip, to a digital value may be achieved in the following manner.

Figure 1:
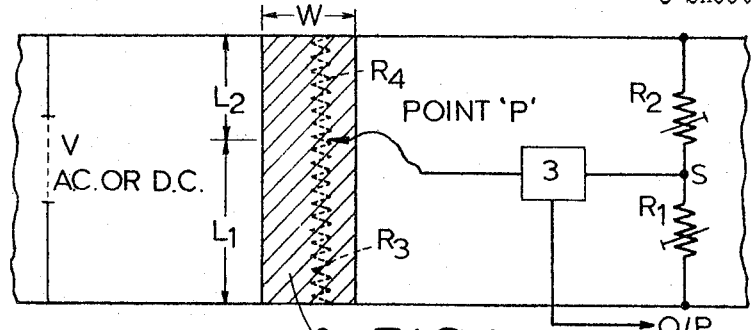
FIGURES 1 to 3 are circuit diagrams each showing diagrammatically the principles according to which the apparatus operates, these principles being shown in a progressively more elaborate form respectively in the three figures.

Referring to FIGURE 1, the metal strip 2 has a total length $(L_1+L_2)$ inches, width W and a thickness of $t$ inches. The stylus pierces the record and makes contact with an arbitrary point such as P on the metal strip 2, when the values of $R_1$ and $R_2$ are electronically adjusted in a manner to be hereinafter described until the output from the null detector 3 becomes a null, the bridge formed by $R_1$, $R_2$, $R_3$, and $R_4$ is balanced.

In this condition $$\frac{VR_1}{R_1+R_2}=\frac{VR_3}{R_3+R_4}$$

now $R_3=\frac{\rho L_1}{Wt}$ and $$R_4=\frac{\rho L_2}{Wt}$$

where $\rho$ is the resistivity of the strip material.
Hence $$\frac{VR_1}{R_1+R_2}=\frac{\frac{V\rho L_1}{Wt}}{\frac{\rho L_1}{Wt}+\frac{\rho L_2}{Wt}}$$

or $$\frac{R_1}{R_1+R_2}=\frac{L_1}{L_1+L_2}$$

since $(L_1+L_2)$ is constant, the if $(R_1+R_2)$ is also made another constant then $$R_1=K_1L_1$$

where $K_1$ is a constant.

Figure 2:
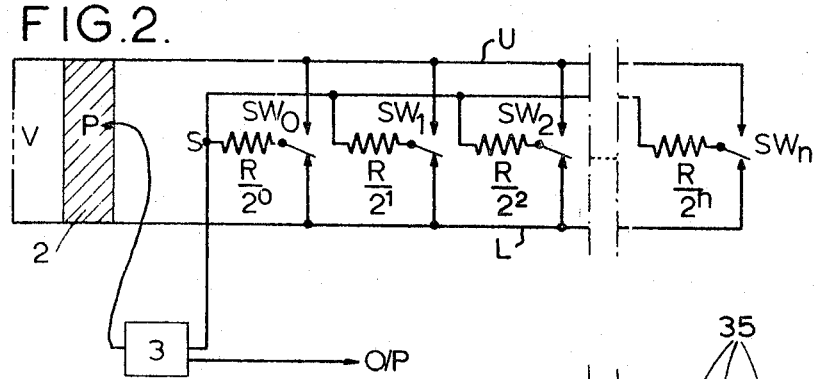

In order to bring the bridge to a balance, it is necessary to adjust the values of $R_1$ and $R_2$, this is achieved automatically by the electronic switching system. Referring to FIGURE 2, a number of resistors may be switched to the lower energising rail L or to the upper energising rail U. If a resistor is switched down to L, it is in the state 1. If the resistor is switched up to U, it is in the state 0. The resistors are arranged in binary order, their values being $$\frac{R}{2^0},\frac{R}{2^1},\frac{R}{2^2},\frac{R}{2^3},\frac{R}{2^4} \cdots \frac{R}{2^n}$$

Resistors switched to the same rail are in parallel, hence the effective resistance is given by $$\frac{1}{R_1EFF}=\frac{1\text{ or }0}{\frac{R}{2^0}}+\frac{1\text{ or }0}{\frac{R}{2^1}}+\frac{1\text{ or }0}{\frac{R}{2^2}}+\frac{1\text{ or }0}{\frac{R}{2^3}}\cdots+\frac{1\text{ or }0}{\frac{R}{2^n}}$$

The terms with a 1 present are included, but those with a zero are excluded. Re-writing, $$\frac{1}{R_1EFF}=\frac{(1\text{ or }0)2^0}{R}+\frac{(1\text{ or }0)2^1}{R}+\frac{(1\text{ or }0)2^2}{R}+\frac{(1\text{ or }0)2^3}{R}\cdots\frac{(1\text{ or }0)2^n}{R}$$

Similarly, those resistors which are switched to the opposite rail are in parallel, and the effective resistance is $$\frac{1}{R_2EFF}=\frac{(0\text{ or }1)2^0}{R}\frac{(0\text{ or }1)2^1}{R}+\frac{(0\text{ or }1)2^2}{R}+\frac{(0\text{ or }1)2^n}{R}$$

Since resistors must be either switched up or switched down, terms in $$\frac{1}{R_1EFF}$$

with a 1 must produce corresponding terms in $$\frac{1}{R_2EFF}$$

with O, vice versa.

If the value of $$\frac{1}{R_2EFF} \text{ is } \frac{N}{R}$$

then automatically, the value of $$\frac{1}{R_1EFF} \text{ is } \frac{K-N}{R}$$

where K is the sum of all the terms in both $$\frac{1}{R_1EFF} \text{ and } \frac{1}{R_2EFF}$$

A voltage will produced at point S with respect to the common line L. This voltage is given by $$V_S=\frac{VR_1EFF}{R_1EFF}=R_2EFF$$

$$V_S=\frac{\frac{VR}{K-N}}{\frac{R}{K-N}+\frac{R}{N}}=\frac{VN}{K}$$

Where K is the constant equal to the sum of all the terms in $$\frac{1}{R_1EFF}$$

and $$\frac{1}{R_2EFF}$$

If the voltage at point S is made equal to the voltage at point P on the strip as mentioned before.

$$\frac{VL_1}{L_1+L_2}=\frac{VN}{K}$$

$$\therefore N\alpha L_1$$

hence the displacement $L_1$ may be directly indicated by the states of switches $SW_0 \ldots SW_n$ which is the binary coded digital value of the displacement $L_1$.

In practice, the switches $SW_0 \ldots SW_n$ are controlled electronically. The control system works on a system of successive approximation.

The successive approximation is carried out in discrete steps. The first step is to set the resistors to produce at the point S a voltage of V/2.

The null detector output indicates if this voltage is greater or less than the voltage at P. If the voltage at S is greater than at P, the switch condition is cleared, if the voltage at S is less than at P, the switch condition is held and locked during the rest of the steps. The second step is to add V/4 to the voltage at S, which may be either 0 or V/2, depending upon the outcome of the first step. Again, the output from the null detector is used either to clear this increment of V/4, or add V/4 for the rest of the steps.

This process is repeated with values of $$\frac{V}{8}, \frac{V}{16}, \frac{V}{32}, \frac{V}{64}, \ldots \frac{V}{2^n}$$

until a balance is achieved.

Figure 3:
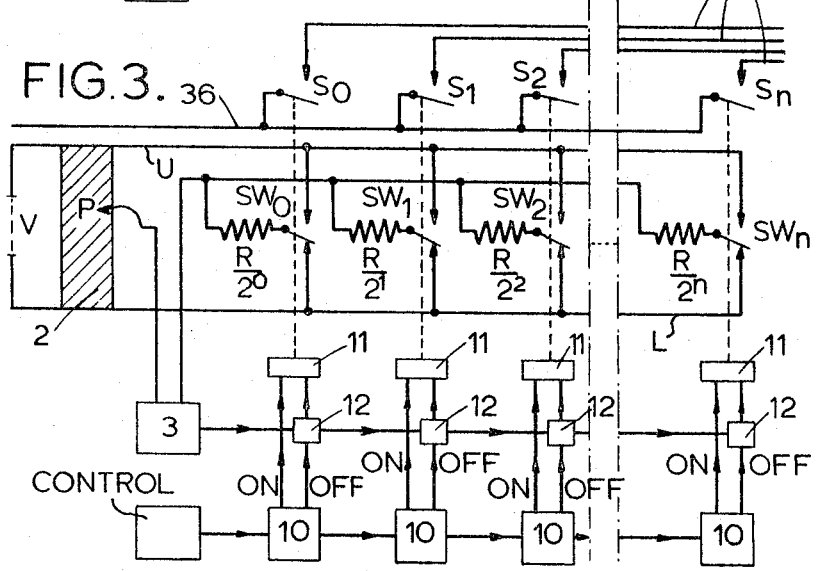

FIGURE 3, shows in block diagram the electronic system. The ring counter 10 is responsible for switching in the increments of voltage. Each part of the ring counter 10 switches on its associated latching relay 11. After approximately 30 ms., the ring counter element 10 produces a pulse which should break the latch 11 releasing the relay, this pulse has to pass via a gate 12 which is controlled by the output of the null detector 3. Should the increment of voltage added to S be insufficient to reach or exceed a balance condition the gate 12 will not allow the pulse to pass. This leaves the increment permanently added.

Thus it will be readily apparent that the displacement of the arbitrary point P from the datum rail L, that is length $L_1$, is directly indicated by the states of the switched $SW_0 \ldots SW_n$. After this, digital information is passed through various arithmetic circuits to produce Scaling Factors, Addition and Subtraction. For this purpose the switches $SW_0 \ldots SW_n$ are mechanically connected respectively to switches $S_0 \ldots S_n$ which selectively connect $n+1$ conductors 35 to a common voltage supply 36 according to the setting of the switches $SW_0 \ldots SW_n$.

It will be further apparent that the embodiment of the invention herein before described is applied to automatically measure displacement from a predetermined datum line, numerous refinements and modifications may be carried out without departing from the scope thereof and the invention may be readily adapted to allow measurements of time base to be automatically carried out by providing an energising voltage which is applied across the width of the strip indicated at W (FIGURE 1), this voltage being of different frequency or phase to the voltage already applied across the length of the strip $(L_1+L_2)$ (FIGURE 1).

Means are also provided to determine the composite potential at point P, the point at which the stylus pierces the record and contacts the metal strip 2 relative to the bottom of the strip and to one side thereof which then forms a datum point for measurement of time base.

We claim as our invention:

1. Apparatus for determining the position of a point on a chart comprising electrical conductors spaced apart to permit at least part of a penetrable chart to be positioned therebetween, an impedance connecting said electrical conductors, means for dividing the impedance by establishing an electrical connection by penetration through the chart at a point thereon, and a variable impedance device for striking a balance between the divided portions of the impedance determined by said impedance dividing means, the balance determining the position of the point.

2. Apparatus according to claim 1 in which the impedance connecting the two conductors is a resistor consisting of a metal strip providing a uniform slope of potential difference between the two conductors.

3. Apparatus according to claim 2 including means to draw said chart over a transparent sheet, with the metal strip above the sheet, means for illuminating the strip being provided beneath the sheet.

4. Apparatus according to claim 1 wherein means for dividing the impedance connecting the conductors comprise a stylus device for piercing the chart.

5. Apparatus according to claim 4, in which the stylus device includes a stylus mounted to yield against resilient restraint into a holder, means within the holder for causing the stylus to rotate about its axis while yielding into the holder, and contacts to be operated when the stylus has traveled a predetermined distance into the holder.

6. Apparatus for determining the position of a point on a chart, comprising electrical conductors spaced apart to permit at least part of a penetrable chart to be positioned therebetween an impedance connecting the electrical conductors, means for dividing the impedance by establishing an electrical connection by penetration through the chart at a point thereon, and a variable impedance device comprising a series of switches, each interposed between the two conductors, impedances associated respectively with the switches, and arranged such that operation of the switches can strike a balance between the means for dividing the impedance and the two conductors, the arrangement being such that the state of each switch represents either a state 1 or a state 0 in the radix 2 digital notation.

7. Apparatus according to claim 6, in which the means for dividing the impedance connecting the conductors comprises a stylus device for piercing the chart.

8. Apparatus according to claim 7, in which the stylus device includes a stylus mounted to yield against resilient restraint into a holder, means within the holder for causing the stylus to rotate about its axis while yielding into the holder, and contacts to be operated when the stylus has traveled a predetermined distance into the holder.

9. Apparatus according to claim 6, in which the impedance connecting the two conductors is a resistor consisting of a metal strip providing a potential difference between the two conductors.

10. Apparatus according to claim 9, including means to draw said chart over a transparent sheet with the metal strip above the sheet, means for illuminating the strip being provided beneath the sheet.

11. Apparatus for determining the position of a point on a chart, the apparatus including electrical conductors spaced apart to permit at least part of a penetrable chart to be positioned therebetween, an impedance connecting the electrical conductors, means for dividing the impedance by establishing an electrical connection by penetration through the chart at a point thereon, and a variable impedance device including a series of switches, each interposed between the two conductors, and impedances associated respectively with the switches connected in parallel through a null detector to the means for dividing the impedance connecting the two conductors, each switch being arranged to connect the associated impedance to either one of the two conductors, such that operation of the switches can strike a balance between the means for dividing the impedance and the two conductors, the arrangement being such that the state of each switch represents either a state 1 or a state 0 in the radix 2 digital notation.

12. Apparatus according to claim 11, in which the means for dividing the impedance connecting the conductors comprises a stylus device for piercing the chart.

13. Apparatus according to claim 12, in which the stylus device includes a stylus mounted to yield against resilient restraint into a holder, means within the holder for causing the stylus to rotate about its axis while yielding into the holder, and contacts to be operated when the stylus has traveled a predetermined distance into the holder.

References Cited by the Examiner

UNITED STATES PATENTS

| 2,020,402 | 11/1935 | Edwards et al. | 200—16 |
| 3,048,776 | 8/1962 | Logan | 324—64 |
| 3,159,829 | 12/1964 | Straehl | 340—347 |

OTHER REFERENCES

Gerber Electronic Data Reader, Model R–2–E information sheet, received in Patent Office, April 1959.

MAYNARD R. WILBUR, *Primary Examiner.*

A. L. NEWMAN, *Assistant Examiner.*